(12) United States Patent
DePue et al.

(10) Patent No.: US 7,121,605 B2
(45) Date of Patent: Oct. 17, 2006

(54) GLOVE BOX WITH SENSOR

(75) Inventors: Todd L. DePue, Brighton, MI (US); David A. Hein, Sterling Heights, MI (US)

(73) Assignee: Lear Corporation, Southfield, MI (US)

(*) Notice: Subject to any disclaimer, the term of this patent is extended or adjusted under 35 U.S.C. 154(b) by 0 days.

(21) Appl. No.: 10/802,274

(22) Filed: Mar. 17, 2004

(65) Prior Publication Data

US 2005/0206182 A1 Sep. 22, 2005

(51) Int. Cl.
*B60N 3/12* (2006.01)
(52) U.S. Cl. .................................. 296/37.12
(58) Field of Classification Search .............. 296/37.12
See application file for complete search history.

(56) References Cited

U.S. PATENT DOCUMENTS

| | | | |
|---|---|---|---|
| 5,292,159 A | | 3/1994 | Sandhu et al. |
| 5,325,078 A | * | 6/1994 | Carothers .................... 335/205 |
| 5,375,805 A | * | 12/1994 | Sudak et al. .............. 248/311.2 |
| 5,531,471 A | * | 7/1996 | Terai ........................... 280/732 |
| 5,601,269 A | * | 2/1997 | Jankovic .................. 248/311.2 |
| 5,823,612 A | | 10/1998 | Angelo |
| 6,050,628 A | | 4/2000 | Allison et al. |
| 6,120,069 A | | 9/2000 | Taranto |
| 6,152,512 A | | 11/2000 | Brown et al. |
| 6,164,711 A | | 12/2000 | Neal et al. |
| 6,237,949 B1 | * | 5/2001 | Nozumi et al. ............. 280/735 |
| 6,270,112 B1 | * | 8/2001 | Bowers .................... 280/728.3 |
| 6,276,713 B1 | * | 8/2001 | Duletzke .................... 280/732 |
| 6,414,591 B1 | * | 7/2002 | Watanabe ................... 340/438 |
| 2002/0125691 A1 | | 9/2002 | Conlee et al. |
| 2002/0162408 A1 | * | 11/2002 | Bentivoglio ..................... 74/2 |
| 2002/0189168 A1 | * | 12/2002 | Sicuranza ...................... 49/26 |
| 2003/0025339 A1 | | 2/2003 | Vitry et al. |
| 2004/0217832 A1 | * | 11/2004 | Lamb et al. ................. 335/205 |

OTHER PUBLICATIONS

Automotive Industries, Sep. 2001 issue; article entitled "Process of Elimination" by Gerry Kobe starting on p. 29; see specifically p. 31, navigation unit.
Magnetic Sensor; located at http://www.mfg.mtu.edu/cyberman/machtool/machtool/sensors/magnetic.html.
Sensor Products by Electronic Materials and Devices Group of Material Sciences Corporation, dated Jan. 15, 2004; located at http://www.msc-emd.com/sensorproducts.shtml.

* cited by examiner

*Primary Examiner*—Lori L. Coletta
(74) *Attorney, Agent, or Firm*—MacMillan, Sobanski & Todd, LLC (57) ABSTRACT

A door assembly for an interior component of a vehicle includes a door body movably attached to an interior component of a vehicle. A sensor is adapted to generate a signal that is a function of a desired position of the door body. An actuator is selectively coupled to the door body, and the actuator is operable to enable the door body to move in response to the signal.

23 Claims, 4 Drawing Sheets

GLOVE BOX WITH SENSOR

BACKGROUND OF THE INVENTION

This invention relates to a door assembly for a vehicle. More particularly, the invention relates a door assembly for an interior vehicle component having a sensor for controlling the movement of the door.

Interior vehicle components, such as instrument panels, often include a compartment or glove box that is formed within the interior component and is accessible by passengers within the vehicle passenger compartment. The compartment is generally separated from the passenger compartment by a cover or door that conceals the compartment and restrains the contents of the compartment within the compartment. It is often desirable to a provide a locking mechanism for restraining a door to an interior compartment, for example, restraining a glove box door to an instrument panel. To release the glove box door from the instrument panel, a handle is provided on the door that allows the user to disengage the locking mechanism. The handle and locking mechanism occupy space within the glove box and may reduce the storage space available within the glove box or increase the size of the glove box assembly.

The glove box door is generally pivotably mounted to the instrument panel. The instrument panel and/or the glove box door may experience warping or deformation during installation within the vehicle or due to exposure to varying temperature and moisture levels within the vehicle. The glove box door and instrument panel may not have or maintain the desired fit relative to one another due to such warping.

It would therefore be advantageous to develop an improved structure for restraining and releasing a door relative to an interior component.

It is known to use a Mirus™ detector cell to detect the position of a glove box door for operating a light within a glove box compartment.

BRIEF SUMMARY OF THE INVENTION

This invention relates to an improved door assembly for an interior component of a vehicle, such as a glove box door assembly within an instrument panel. The door assembly includes a door body movably attached to an interior component of a vehicle. A sensor is adapted to generate a signal that is a function of a desired position of the door body. An actuator is selectively coupled to the door body, and the actuator is operable to enable the door body to move in response to the signal.

In a preferred embodiment, the door body may be movable by the actuator to or from a closed position or an open position in response to the signal. In a preferred embodiment, the door body may be movable by the actuator to a position that is flush with the current position of the interior component.

In a preferred embodiment, the signal generated by the sensor is a of function of at least one of the distance between the door body and the interior component, the distance between the sensor and the door body, and the sensor and the interior component. The signal may also be representative of the presence of an object near or in contact with the door assembly, although such is not required.

In a preferred embodiment, the sensor may include a field effect device, an optical sensor, a magnetic sensor, a Hall Effect device, a Piezo device, and/or a photoelectric device.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
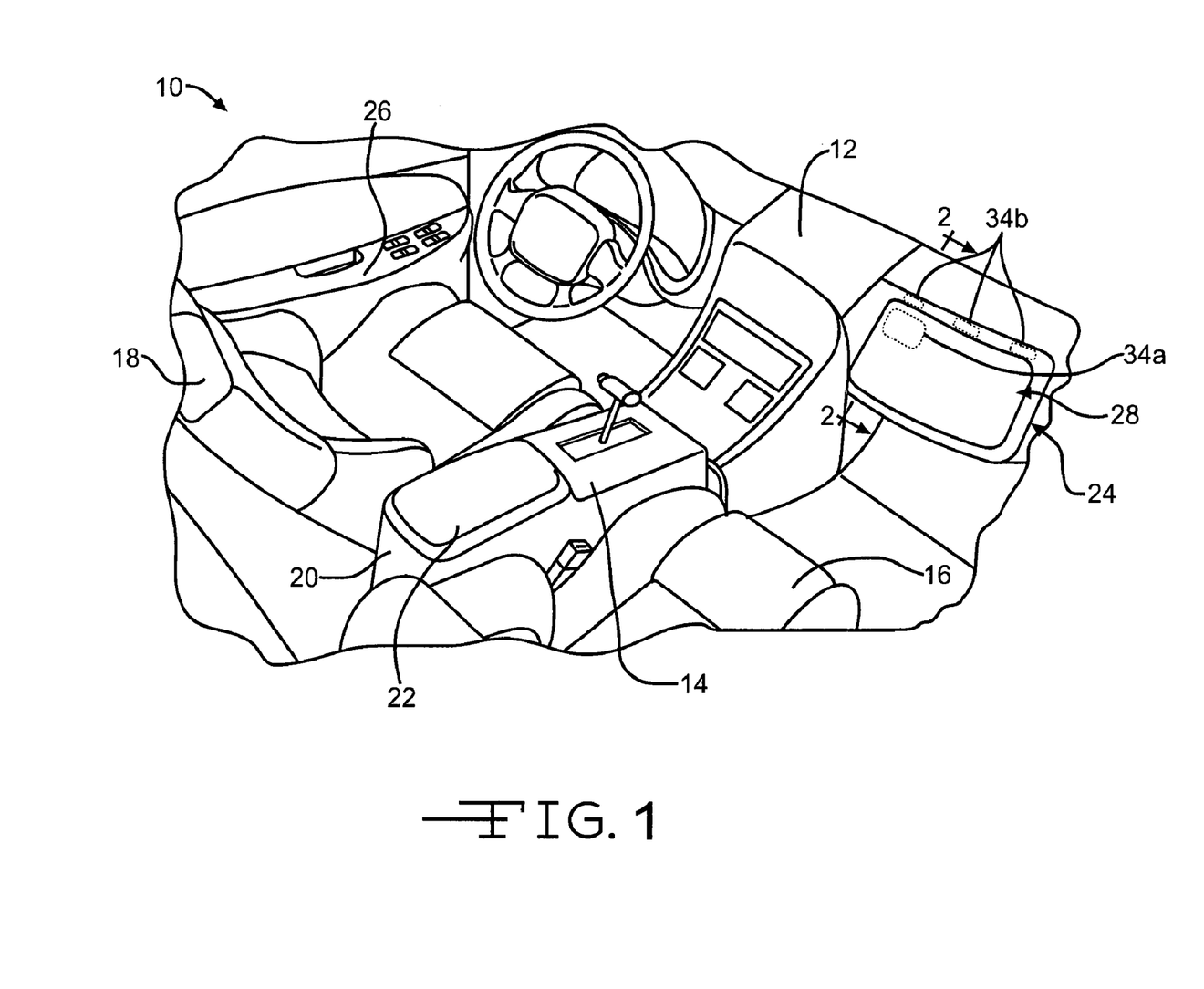
FIG. 1 is a schematic perspective view of a portion of an interior passenger compartment of a vehicle having a door assembly in accordance with the present invention.

Referring now to the drawings, there is illustrated in FIG. 1 a portion of an interior passenger compartment of a vehicle, indicated generally at 10. The illustrated vehicle interior passenger compartment 10 is, in large measure, conventional in the art and is intended merely to illustrate one environment in which this invention may be used. Thus, the scope of this invention is not intended to be limited for use with the specific structure for the vehicle interior passenger compartment illustrated in FIG. 1 or with vehicle interior passenger compartments in general. On the contrary, as will become apparent below, this invention may be used in any desired environment for the purposes described below.

The vehicle interior passenger compartment 10 includes an instrument panel or dashboard 12. Positioned within the instrument panel 12 are various visual gauges for the driver's convenience, and various temperature and climate controls. Other controls, storage compartments and stereo controls may be positioned within the instrument panel 12 or within a lower console 14. The lower console 14 is positioned between a passenger seat 16 and a driver seat 18 and may include a storage compartment 20 that has a lid 22 that can also serve as an armrest. The storage compartment 20 can be accessed by lifting the armrest lid 22. It will be appreciate that the storage compartment 20 may extend into the back seat area (not shown) of the vehicle interior passenger compartment 10. Alternatively, a second storage compartment (not shown) may be provided in the back seat are (not shown). An overhead console (not shown) can also be accessible from within the interior passenger compartment of the vehicle. The overhead console can contain various controls, such as a garage door opener, climate controls, etc. The overhead console can also contain storage compartments for sunglasses, portable media, or a mobile phone. Also located within the passenger compartment is a storage compartment or glove box 24 that may be partially or completely disposed within the instrument panel 12. The vehicle interior passenger compartment 10 may be partially defined by vehicle doors 26.

As illustrated, the glove box 24 includes a door assembly 28. However, it will be appreciated that the door assembly 28 may be positioned within or a portion of any portion of the vehicle interior passenger compartment 10. For example, the door assembly 28 may be provided within or attached to at least one of the instrument panel 12, the lower console 14, a portion of the driver seat 18, a portion of the passenger seat 16, the compartment 20, the lid 22, the glove box 24, a portion of the vehicle doors 26, or any other portion or several portions of the vehicle interior passenger compartment 10.

The door assembly 28 may be used to cover any component or any portion thereof within the interior passenger compartment 10. For example, the door assembly 28 may selectively cover a storage compartment, such as the door assembly 28 selectively dividing the glove box 24 from the interior passenger compartment 10, as illustrated, or the door assembly 28 may cover various controls disposed on the instrument panel 12 or lower console 14. It will be appreciated that the door assembly 28 may be disposed within or on any of the interior vehicle components described above or within or on any other component of the interior passenger compartment 10.

Figure 2:
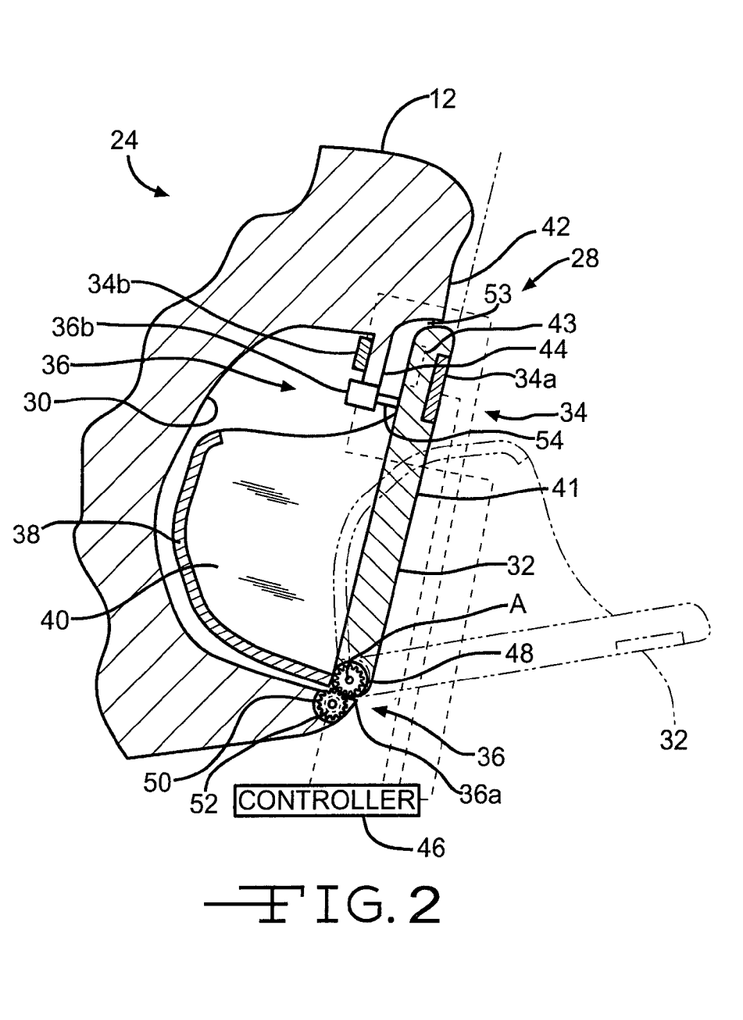
FIG. 2 is a schematic cross sectional view of the door assembly illustrated in FIG. 1, shown in a generally closed position.

Referring now to FIG. 2, there is an enlarged schematic cross-sectional view of the instrument panel 12, glove box 24, and door assembly 28 shown in FIG. 1. In a preferred embodiment, the glove box 24 is defined by an opening 30 within the instrument panel 12 and is selectively divided from the interior vehicle component 10 by the door assembly 28. It should be appreciated that the opening 30 and the glove box 24 can have any desired shape and cross-section. The door assembly 28 includes a door body 32 that is rotatably attached to the instrument panel 12. The door assembly 28 further includes at least one sensor 34 that is adapter generate a signal that is a function of a desired position of the door body 28. The door assembly 28 also includes at least one actuator 36 for selectively connected to the door body 32. The at least one actuator 36 is operable to move the door body in response to the signal generated by the at least one sensor 34.

As illustrated, the door body 32 is rotatably attached to the instrument panel 12 about a pivot point A. However, it will be appreciated that the door body 32 may be attached to or supported by any interior vehicle component in any manner. The door body 32 as shown is rectangular. However, it will be appreciated that the door body 32 may be any desired shape and size. Although such is not required, the door body 32 may be flexible or capable of slight deformation to achieve the desired fit between the door body 32 and the instrument panel 12, as will be described herein. The door body 32 is illustrated and described as a single panel, although it is contemplated that the door body 32 may include multiple panels movably secured to one another or each movably secured to an interior component. At least one side wall 38 may be secured to the door body 32, although such is not required. The side wall 38 may extend from the door body 32 into the opening 30 and may define a storage compartment 40 within the opening 30, although such is not required.

As illustrated in FIG. 2, the door body 32 is in a closed position in which an outer surface 41 of the door body 32 is positioned generally flush with an outer surface 42 of the instrument panel 12 to cover the opening 30. The door body 32 is movable between the closed position and an open position in which the door body 32 is positioned to allow access to the opening 30 and/or storage compartment 40 from the passenger compartment of the vehicle, as shown in phantom in FIG. 2. The door body 32 may be biased toward the open position or the closed position, as will be described below.

The sensor 34 is adapted to generate a signal that is a function of a desired position of the door body 32. The sensor 34 may be additionally be adapted to detect at least one condition indicative of the desired position of the door body 32. For example, the sensor 34 may include a non-mechanical or non-movable touch cell or switch, such as, but not limited to, resistive, inductive, piezoelectric and capacitive switches. The sensor 34 may include a non-contact cell or switch, such as a field effect device, an optical sensor, a magnetic sensor, a Hall Effect device, a Piezo device, and/or a photoelectric device, although such is not required. In a preferred embodiment, the sensor 34 may include a field effect cell, such as the Mirus™ detector cells available from the Material Sciences Corporation. In such a preferred embodiment, the cell of the sensor 34 may include a first electrode, a second electrode and an active component (not shown). The second electrode is spaced from and surrounds the second electrode. The active component provides an oscillating electric field to the two electrodes creating an electric field about the cell. When a stimulus interrupts the electric field, the active component of the sensor 34 senses the interruption and generates a signal indicative of the interruption.

The signal generated by the sensor 34 may be a function of at least one of the distance between the door body and the interior component, the distance between the sensor and the door body, and the sensor and the interior component. The signal may also be representative of the presence of an object near or in contact with the door assembly and/or the pressure exerted by an object on the door assembly 28. In a preferred embodiment, the sensor 34 includes a field effect sensor device and may be particularly suited to detect the presence or conditions of an object or portion of the door assembly that is at least partially comprised of one of a metal and a liquid. For example, the sensor 34 may be located on a portion of the door body 32 and a portion 43 of the instrument panel 12 may be comprised partially of metal. The sensor 34 is then capable of detecting the distance between the door body 32 and the metal portion 43 of the instrument panel 12. As illustrated in FIGS. 1 and 2, a first sensor 34a is disposed within the door body 32 and a second sensor 34b is disposed on a flange 44 of the instrument panel 12, although such is not required. It will be appreciated that the sensors 34a and 34b are schematically positioned as illustrated in FIG. 1. The sensor 34 may be positioned near, on, or within the door body 32 or other portion of the door assembly 28. Further, any portion of the sensor 34 may be located within the interior passenger compartment of the vehicle so that the portion of sensor 34 is easily accessible to the driver or passengers within the vehicle which may not be proximate the location of the door assembly 28 within the vehicle. It will be appreciated that the sensor 34 may be a single sensor device or a plurality of sensors, and each of the plurality of sensors may be capable of generating at least one signal that may be a function of at least one of a plurality of detected conditions. It will also be appreciated that in a preferred embodiment the sensor 34 may be insert molded to at least one of the door body 32 and the instrument panel 12.

The at least one actuator 36 is selectively coupled to the door body 32 to enable the door body 32 to move relative to the instrument panel 12 in response to the signal generated by the at least one sensor 34. The actuator 36 may be any actuation device capable of moving the door body 32. For example, the actuator 36 may include at least one of a gear assembly, a gear rack assembly, a cam assembly, and coiled rope assembly with a viscous damper, as will be described below. The actuator 36 may facilitate only a portion of the movements of the door body 32. For example, the door body 32 may be movable from the open position to the closed position by the actuator 36, and may be movable from the closed position back to the open position by a biasing means (not shown) or visa-versa, although such is not required. It will be appreciated that the actuator 36 may facilitate the movement of the door body 32 between the open position and the closed position and the return movement from the closed position to the open position.

The controller 46 may be any microprocessor capable of receiving and/or interpreting the signal generated by the sensor 34 and generating a command to the actuator 36 in response to that signal. The controller 46 may be able to calculate or extrapolate additional conditions or characteristics of the door assembly 28 based on the signal received from the sensor 34. For example, the position or outer surface location of the door body 32 or instrument panel 12 may be determined as a function of a signal or signals received. The position or outer surface location of the door body 32 may then be used to determine the desired position of the door body 32. The controller 46 may access a look-up table or other series of stored values to calculate, interpret, or extrapolate conditions of the door assembly 28, the desired position of the door body 32, and/or the required movement of the actuator 36. It will be appreciated that the controller 46 may receive multiple signals from the at least one sensor 34 and may used a variety of combinations of such signals to calculate at least one condition or characteristic of the door assembly 28. In response to the signal received and interpreted and/or the additional conditions calculated for the door assembly 28, the controller 46 generates commands that are sent to actuator 3–6. The commands sent to the actuator 36 may include commands to control the movement of the actuator 36 such that the actuator 36 moves the door body 32 as indicated by the sensor 34 and determined by the controller 46. The controller 46 may include processing, memory, and storage devices as required to perform the functions described herein. It will be appreciated that the sensor 34 may be adapted to send signals indicative of the desired position of the door body 32 directly to the actuator 36, such that the controller 46 is not required.

As illustrated in FIG. 2, the actuator 36 comprises a first actuator 36a and a second actuator 36b, although such is not required. It will be appreciated that the actuator 36 is illustrative of one device suitable for inducing movement in the door body 32 and that any actuation device may be used to induce movement in the door body 32 in accordance with this invention. It will be appreciated that the actuator 36 may include only a single device for inducing movement in the door body 32. Further, if multiple members comprise the door body 32, each of the door body members may be actuated independently of one another by the actuator 36 in accordance with this invention.

As illustrated, the first actuator 36a is a gear assembly including a first gear 48 rotatably supported about the pivot A and rotatably fixed to the door body 32. The first actuator 36a includes a second gear 50 rotatably driven by a motor 52. The motor 52 is operatively connected to the controller 46. The second actuator 36b may include an actuation device and may cooperate with an arm 54 extending outwardly from the door body 32 to induce movement in the door body 32. It will be appreciated that both the first actuator 36a and the second actuator 36b are not required, and the invention may be practiced using either of the first actuator 36a or the second actuator 36b. It will further be appreciated that the invention may be practiced using any combination of the elements described herein, particularly any combination or portion of the embodiments of the actuator described herein.

Figure 3:
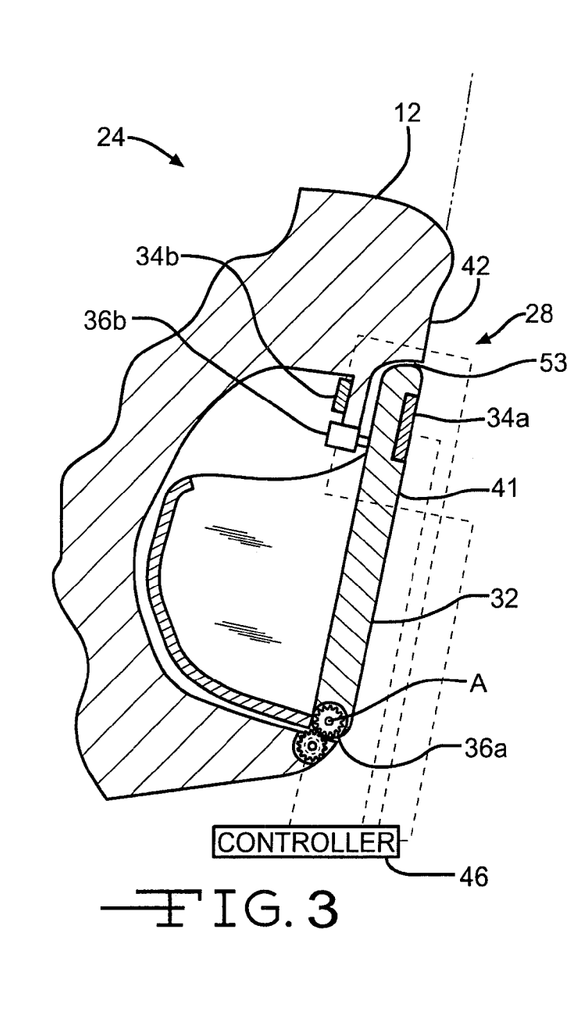
FIG. 3 is a schematic cross sectional view of the door assembly illustrated in FIGS. 1 and 2, shown in a closed position after the position of the door has been adjusted for a flush fit relative to the interior component.

The operation of the door assembly 28 will now be described. For the purpose of explanation, we will assume that the door body 32 has been moved from the open position to the generally closed position, as illustrated in FIG. 2. In the generally closed position a gap 53 exists between the door body 32 and the flange 44 of the instrument panel 12. Upon detecting at least one characteristic or condition of the door assembly 28 indicative of the door body 32 being moved from the open position to the closed position, the sensor 34 may detect and transmit a signal indicative of another sensed condition to the controller 46. The sensor 34 may detect various conditions, including but not limited to the depth of the gap 53 or the distance from the door body 32 to the flange 44 of the instrument panel 12 and generate a signal that is a function of such conditions to the controller 46. The controller 46 receives and/or interprets the signal. The controller 46 then determines the appropriate movement (or lack of movement) required to position the door body 32 relative to the instrument panel 12 and reduce the gap 53, as desired. The controller 46 then commands the actuator 36 to induce movement of the door body 32, if required. As shown in FIG. 3, the door body 32 has been repositioned to a flush position by the actuator 36 and the controller 46 in which the door body 32 is generally flush with the surface 42 of the instrument panel 12. The gap 53 has been reduced to accommodate the repositioning of the door body 32 relative to the flange 44. In a preferred embodiment, the second actuator 36b controls the movement of the door body 32 between the closed position and the flush position, although such is not required. The door body 32 may be moved between the closed position and the position that is flush with the surface 42 of the instrument panel by either or both the first and second actuators 36a, 36b. It will be appreciated that movement from the closed position to the flush position is one movement of the door body 32 that may be induced by the actuator 36 in accordance with the present invention. It will further be appreciated that movement of the door body 32 from the closed position to the flush position is not required to practice the present invention.

From either the closed position or the flush position, the door body 32 may be moved to the open position, as shown in phantom in FIG. 2. The sensor 34 may be adapted to detect at least one characteristic or condition of the door assembly 28 indicative of a passenger (not shown) within the vehicle desiring the door body 32 to be moved from the closed or flush position to the open position. For example, the passenger may move a hand or other object in close proximity to or in contact with the sensor 34 or the passenger may touch or depress a button or other interface device comprising a portion of the sensor 34. In a preferred embodiment, the sensor 34a is adapted to detect a condition indicative of a passenger within the vehicle desiring the door body 32 to be moved from the closed or flush position to the open position, and the sensor 34a is disposed near the outer surface 41 of the door body 32. The sensor 34 may then generate a signal indicative of the desired position of the door body 32 to the controller 46. The controller 46 receives and/or interprets the signal and commands the actuator 36 to induce movement of the door body 32, if required. In a preferred embodiment, the first actuator 36a controls the movement of the door body 32 between the closed position or the flush position to the open position, although such is not required. The door body 32 may be moved between the closed position, the flush position, and the open position by either or both of the first and second actuators 36a, 36b. It will also be appreciated that the door assembly may include a biasing means (not shown), such that the door body 32 is urged toward the open position so that the door body 32 will move to the open position if not restrained by the actuator 36.

From the open position, the door body 32 may be moved to the closed position, as shown in FIG. 2, or the flush position, as shown in FIG. 3. The sensor 34 may be adapted to detect at least one characteristic or condition of the door assembly 28 indicative of a passenger (not shown) within the vehicle desiring the door body 32 to be moved from the open position to the closed or flush position. For example, in a first embodiment, the passenger may push the door body 32 to the closed position. The sensor 34 may then detect that the door body 32 has been moved to the closed position. Optionally, the sensor 34 may further detect other conditions and send a signal indicative of those conditions to the controller 46 to determine how to command the actuator 36 to move the door body 32 to the flush position, such that after the door body 32 is moved to the closed position, the door body 32 is automatically adjusted to the flush position. In another embodiment, the passenger may move a hand or other object in close proximity to or in contact with the sensor 34 or the passenger may touch or depress a button or other interface device comprising a portion of the sensor 34. The sensor 34 may then transmit a signal indicative of the desired position of the door body to the controller 46. The controller 46 receives and/or interprets the signal and commands the actuator 36 to induce movement of the door body 32, if required, to move the door body 32 to the closed position and/or flush position. In a preferred embodiment, the first actuator 36a controls the movement of the door body 32 between the open position and the closed and/or flush position, although such is not required.

The closed position for the door body 32 may be determined by a stop or detent (not shown) secured to the instrument panel 12 that contacts the door body 32. If the door body 32 is to be moved further toward the instrument panel 12 to the flush position, the actuator 36 may be adapted to retract the stop such that the door body 32 may move past the stop closer to the instrument panel 12. Optionally, the closed position for the door body 32 may be a position that is retained or stored in the memory of the actuator 36 and/or controller 46.

During operation of the door assembly 28, the sensor 34 may be continually detecting conditions indicative of the door assembly 28 being in use and/or the current relative position of the door body 32, and the sensor 34 may operate in various modes in which varying conditions are detected. For example, the sensor 34 may operate in a non-use mode in which the sensor 34 detects only the presence of the door body 32 in the closed position. Once the absence of the door body 32 in the closed position is detected, the sensor 34 may begin operating in a use mode in which the sensor 34 detects various other conditions of the door assembly 28. The sensor 34 may also detect or continue to detect conditions indicative of the door body 32 returning to the closed position. Once a condition is detected indicating that the door body 32 has returned to the closed position, the sensor 34 may generate a signal indicative of the return, and the sensor may return to the non-use mode.

It will be appreciated that the sensor 34 and/or the controller 46 may include thresholds that the sensed condition readings must meet, exceed, or remain below in order to induce corresponding movement in the door body 32. The thresholds could be implemented as requiring a time delay between sensor readings or requiring changes in sensed conditions to meet or exceed shock values, such as force as a function of time, to prevent undesirable movement of the door body 32. For example, if the sensor 34 detects that an object larger than 1 (one) square inch has made contact with the sensor 34a, the sensor 34 may ignore the contact detected because the contact may be the result of a passenger's knee or other object contacting the sensor 34a that is not indicative of the passenger desiring the door body 32 to be opened. It would be undesirable to allow the door body 32 to open after the sensor 34a has detected mere unintentional contact. Thus, it may be desirable that the sensors 34 and/or the controller 46 be programmed or otherwise controlled to prevent the undesirable actuation of the actuator 36 and movement of the door body 32.

Figure 4:
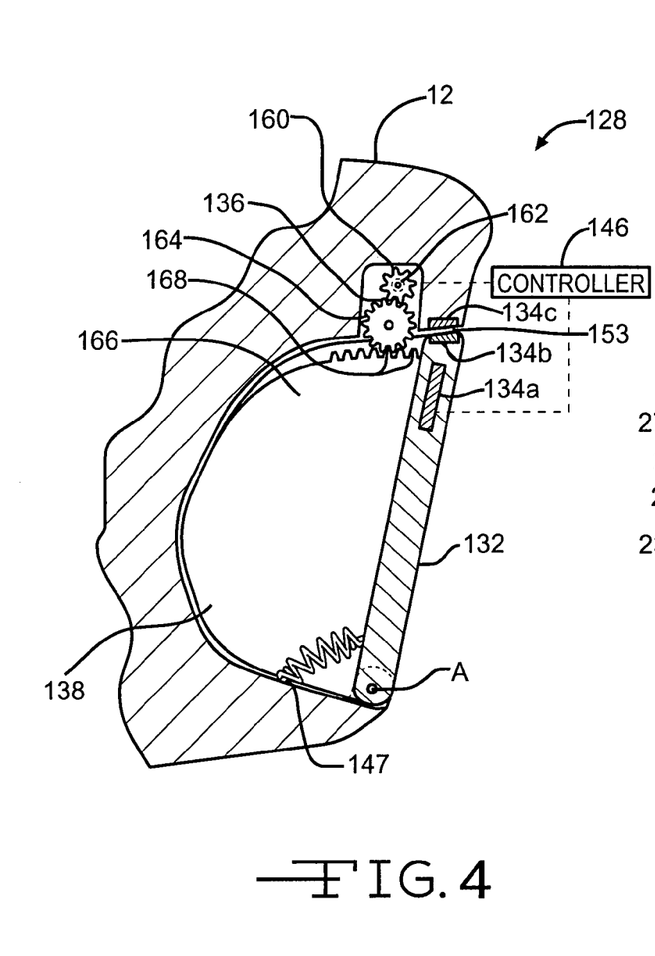
FIG. 4 is a schematic cross sectional view of a door assembly in accordance with the present invention.

Referring now to FIG. 4, there is illustrated a second embodiment of a door assembly, indicated generally at 128, in accordance with the present invention The door assembly 128 is similar to the door assembly 28 and only the components that differ will be described herein. Many of the components of the door assembly 128 as illustrated in FIG. 4 are similar in structure and function to corresponding components of the door assembly 28 as illustrated in FIGS. 2 and 3. Therefore, such corresponding components are indicated by similar reference number in these Figures, but with the components of the door assembly 128 as illustrated in FIG. 4 having the addition of 100 to each reference number.

The sensor 134 is comprised of a first sensor 134a disposed within the door body 132. It will be appreciated that the location of the sensor 134a may be delimited on the door body 132 by an indentation, ridge, or other surface marking on the door body 132, although such is not required. It will also be appreciated that the door body 132 may not contain any visual indication of location of the sensor 134a in the door body 132. The sensor 134 further comprises a second sensor 134b and a third sensor 134c. The sensor 134b is formed in or affixed to the instrument panel 112. The sensor 134c is formed in or affixed to the door body 132. The sensors 134a, 134b, 134c comprising the sensor assembly 134 may be located within a proximity to the door assembly 128 so that the sensor 134 may detect a desired condition of or near the door assembly 128. Thus, it will be appreciated that the sensor assembly 134 may be located within the door assembly 128 or instrument panel 112 such that a portion of the door assembly 128 or instrument panel 112 is disposed between the sensor 134 and the location where the condition detected exists. The sensor 134b and the sensor 134c may detect data that is combined by the controller 146 to determine the position of the door body 132 relative to the instrument panel 112, although such is not required. It will be appreciated that the sensor 134 may include a single sensor or any number of sensors for determining at least one characteristic or condition of or near the door assembly 128. As illustrated, the sensor 134a is not exposed directly to a passenger's hand from the interior passenger compartment of the vehicle, although such is not required. Each of the sensors 134a, 134b, 134c comprising the sensor assembly 134 may detect different conditions and/or characteristics of or near the door assembly 128 and generate one or more signals that are functions thereof. For example, the first sensor 134a may detect a condition indicating that the passenger desires that the door body 132 be opened. The second and third sensors 134b, 134c may detect the current position of the door body 132 relative to the instrument panel 112, such that the signal generated by the second and third sensors 134b, 134c may be used by the controller 146 to more precisely position the door body 132 relative to the instrument panel 112. However, it will be appreciated that the signal generated by the first, second, and third sensors 134a, 134b, 134c may be used in any manner described throughout this application.

The actuator 136 is illustrated as a gear assembly including a first gear 160 rotatably driven by a motor 162. The first gear engages a second gear 164 that is fixed to the instrument panel 112, such that the second gear 164 is free to rotate. The side wall 138 may include a flange portion 166. The flange portion 166 may include a plurality of gear teeth 168 formed therein for engaging the second gear 164. The gear teeth 168 may extend along an arcuate path or other path in the flange portion 166 that results in the gear teeth 168 engaging the second gear 164 throughout the range of motion of the door body 132 relative to the instrument panel 112. As shown, the gear teeth 168 extend along only a portion of the flange portion 166. Therefore, as illustrated, the actuator 136 only induces movement in the door body 132 between the flush position, the closed position, and/or a partially open position. Thus, the actuator 136 does not move the door body 132 to or from the open position. The door body 132 may be manually moved by the passenger from the partially open or closed position to the open position and from the open position to the closed position. Alternatively or additionally, the actuator 136 may include an additional mechanism (not shown) for moving the door body 132 from the partially open or closed position to the open position and from the open position to the closed position. Alternatively or additionally, the door body 132 may include a biasing mean 147 attached to the instrument panel 12 to urge the door body 132 toward the open or closed position when the actuator 136 has disengaged the door body 132.

Figure 5:
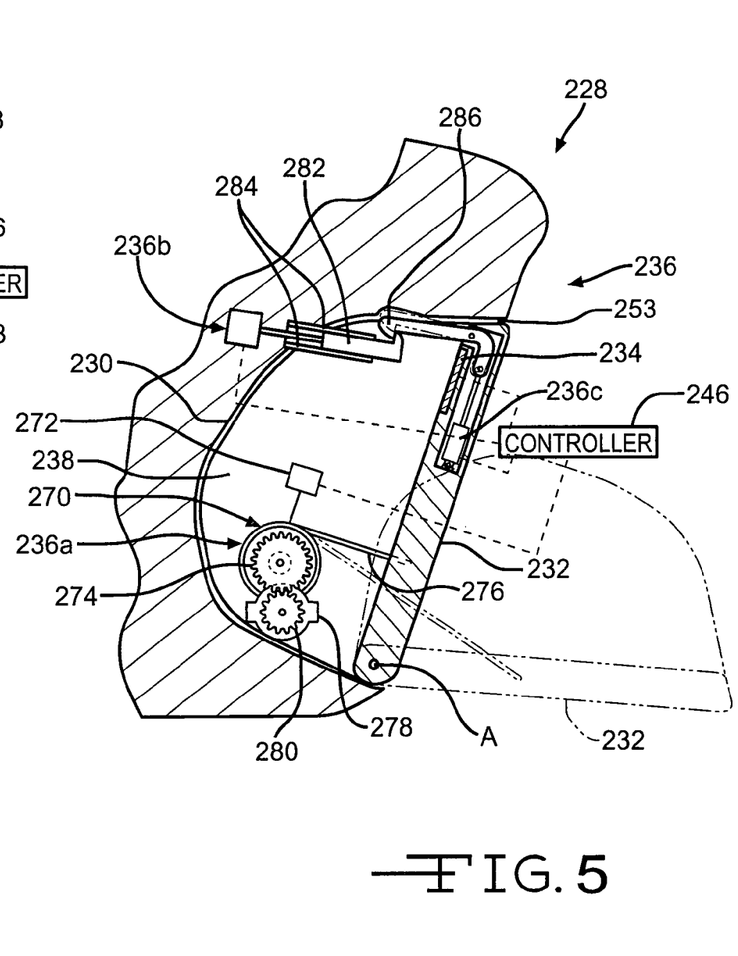
FIG. 5 is a schematic cross sectional view of a door assembly in accordance with the present invention.

Referring now to FIG. 5, there is illustrated a third embodiment of a door assembly, indicated generally at 228, in accordance with the present invention. The door assembly 228 is similar to the door assembly 28 and only the components that differ will be described herein. Many of the components of the door holder assembly 228 as illustrated in FIG. 5 are similar in structure and function to corresponding components of the door assembly 28 as illustrated in FIGS. 2 and 3. Therefore, such corresponding components are indicated by similar reference number in these Figures, but with the components of the door assembly 228 as illustrated in FIG. 5 having the addition of 200 to each reference number.

As illustrated, a sensor 234 is mounted on the door body 234 on a surface defining the opening 230. Therefore, the sensor 234 is not in direct contact with a passenger within the interior vehicle compartment, although such is not required.

An actuator 236 includes a first actuator 236a. The first actuator 236a is disposed between a portion of the instrument panel 12 forming the opening 230 and a side wall 238 secured to the door body 232. The first actuator 236a includes a gear and cable assembly 270. The gear and cable assembly 270 may be partially rotationally driven by a motor 272 as illustrated, although such is not required. Alternatively or additionally, the gear and cable assembly 270 may include a biasing means (not shown) for retracting the door body 232 or a biasing means may be directly connected to the door body 232 for retracting or opening the door body 232. A gear portion 274 of the gear and cable assembly 270 is fixedly mounted for rotation to the instrument panel 212. A cable portion 276 of the gear and cable assembly 270 is attached at a first end to the gear portion 274 and is attached at a second end to the door body 232. The cable portion 276 may be wound and unwound from the gear portion 274 to induce movement in the door body 232. The first actuator 236a may also include a damper mechanism 278, although such is not required. The damper mechanism 278 may retard the movement of the door body 232 as induced by any portion of the actuator 236 to provide a more desirable relatively slow, smooth deployment or retraction of the door body 232. The damper mechanism 278 dampens the motion of the gear portion 274 as the gear portion 274 rotates. Any suitable damper mechanism may be used. For example, the damper mechanism 278 may include a gear 280 rotatably mounted to the instrument panel 12. The gear 280 is meshingly engaged with the gear portion 274. The cavity is filled with a fluid having a desired viscosity. As the gear portion 274 rotates, the fluid within the cavity hinders rotation of the gear 280 within the cavity thereby dampening the movement of the gear and cable assembly 270. It will be appreciated that a similar viscous damper may be included in any of the actuators described herein.

The actuator 236 further includes a second actuator 236b and a third actuator 236c. The second actuator 236b includes an hook member 282. The hook member 282 may be slideably mounted within a track 284 that is attached to the instrument panel 212. The hook member 282 is slideably moveably within the track 284 by the actuator 236b to engage an arm member 286 of the third actuator 236c. The arm member 286 may be pivotable mounted to the door body 232 and movable to engage and disengage the hook member 282. The pair of actuators 236b, 236c cooperate to release and restrain the door body 232 in the closed and/or flush positions as described herein. It will be appreciated that the first actuator 236a and the second and third actuators 236b, 236c may be provided within a door assembly 228 and cooperate to control the movement of the door body 232, or only a portion of the actuators 236a, 236b, and 236c may be provided within a door assembly 228 in accordance with this invention.

Figure 6:
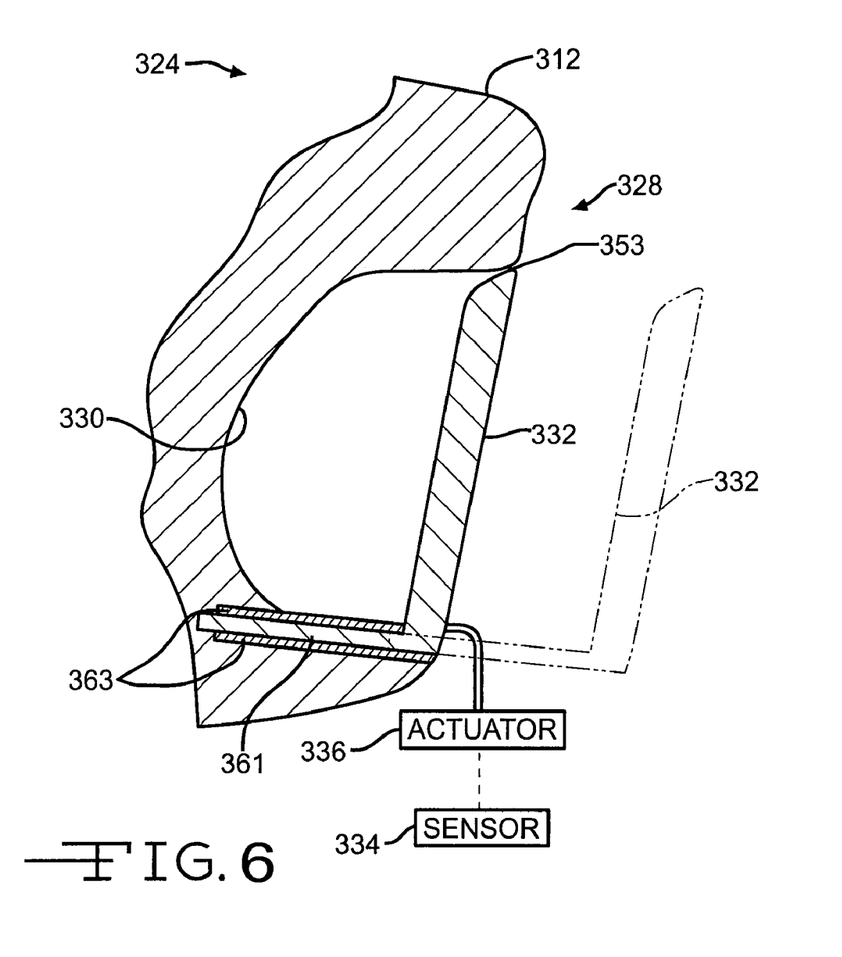
FIG. 6 is a schematic cross sectional view of a door assembly in accordance with the present invention.

Referring now to FIG. 6, there is illustrated a fourth embodiment of a door assembly, indicated generally at 328, in accordance with the present invention. The door assembly 328 is similar to the door assembly 28 and only the components that differ will be described herein. Many of the components of the door holder assembly 328 as illustrated in FIG. 6 are similar in structure and function to corresponding components of the door assembly 28 as illustrated in FIGS. 2 and 3. Therefore, such corresponding components are indicated by similar reference number in these Figures, but with the components of the door assembly 328 as illustrated in FIG. 6 having the addition of 300 to each reference number.

As illustrated, a sensor 334 is mounted within an interior vehicle compartment 310. At least a portion of the sensor 334 may be positioned remote from the door assembly 328. This portion of the sensor 334 may be mounted within the interior vehicle compartment 310 in a location that is easily accessible a passenger within the interior vehicle compartment 310, although such is not required.

The door body 332 is slideably mounted to an instrument panel 312. However, it will be appreciated that the door body 32 may be mounted to the instrument panel 312 in any manner. As illustrated, the door body 332 includes an armature 361 which is disposed within a track assembly 363, although such is not required.

An actuator 336 is selectively coupled to the door body 332 to induce movement in the door body 332. The actuator 336 may enable the armature 361 of the door body 332 to slide along the track assembly 363. Alternatively or additionally, the actuator 336 may include a biasing means (not shown) for retracting the door body 332 or a biasing means may be directly connected to the door body 332 for retracting or opening the door body 332.

It will be appreciated that in accordance with the present invention any of the elements described herein for this invention may be practiced alone or in combination with other elements and embodiments of the invention. In particular, it will be appreciated that the actuators described herein may be selectively coupled to the respective door bodies to enable the door bodies to move to any one or combination of the positions described in accordance with the present invention. Further, it will be appreciated that the sensors described herein may generate respective signals indicative of any one or combination of conditions of or near the door assemblies that may be functions of the respective desired positions of the door bodies.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A door assembly for an instrument panel of a vehicle comprising:
   a door body movably attached to an instrument panel, wherein the instrument panel and said door body define a glove box;
   a sensor adapted to generate a signal that is a function of a desired position of said door body; and
   an actuator selectively coupled to said door body, wherein said actuator is adapted to move said door body in response to said signal to achieve a desired position of said door body relative to said instrument panel.

2. The door assembly according to claim 1, wherein said instrument panel includes an outer surface defining an opening therein and wherein said door body is movable between a closed position in which the door body is positioned generally flush with said outer surface of said instrument panel to cover the opening within the instrument panel and an open position in which the door body is positioned to allow access to the opening within the instrument panel from the passenger compartment of the vehicle.

3. The door assembly according to claim 2, wherein said actuator is adapted to move said door body to said open position in response to said signal.

4. A door assembly comprising:
   an instrument panel of a vehicle including an outer surface defining an opening therein;
   a door body movably attached to the instrument panel of a vehicle, wherein said instrument panel and said door body define a glove box, said door panel being movable between a closed position in which the door body is positioned generally flush with said outer surface of said instrument panel to cover the opening within the instrument panel and an open position in which the door body is positioned to allow access to the opening within the instrument panel from the passenger compartment of the vehicle;
   a sensor adapted to generate a signal that is a function of a desired position of said door body; and
   an actuator selectively coupled to said door body, said actuator operable to move said door body to said closed position in response to said signal.

5. The door assembly according to claim 2, wherein said actuator is adapted to move said door body from said closed position to a position flush with said outer surface of said instrument panel in response to said signal.

6. A door assembly for an instrument panel of a vehicle comprising:
   a door body movably attached to an instrument panel of a vehicle, wherein said instrument panel and said door body define a glove box;
   a sensor adapted to generate a signal that is a function of a desired position of said door body; and
   an actuator selectively coupled to said door body, said actuator operable to enable said door body to move in response to said signal, wherein said signal is a function of at least one of the distance between said door body and said instrument panel, the distance between said sensor and said door body, and said sensor and said instrument panel.

7. A door assembly for an instrument panel of a vehicle comprising:
   a door body movably attached to an instrument panel of a vehicle, wherein said instrument panel and said door body define a glove box;
   a sensor adapted to generate a signal that is a function of a desired position of said door body; and
   an actuator selectively coupled to said door body, said actuator operable to enable said door body to move in response to said signal, wherein said signal is representative of the presence of an object near or in contact with said door assembly.

8. The door assembly according to claim 1, wherein said door assembly further comprises a plurality of sensors, each of said plurality of sensors is capable of detecting at least one of a plurality of conditions.

9. The door assembly according to claim 1, wherein the sensor includes at least one of a field effect device, an optical sensor, a magnetic sensor, a Hall Effect device, a Piezo device, and a photoelectric device.

10. The door assembly according to claim 1, wherein said door assembly further includes a latch mechanism to retain said door body to said instrument panel.

11. The door assembly according to claim 10, wherein said latching mechanism is incorporated within said actuator.

12. The door assembly according to claim 1, wherein said actuator is adapted to restrain said door body in a desired position relative to said instrument panel.

13. The door assembly according to claim 1, wherein at least a portion of said sensor is positioned on said instrument panel.

14. The door assembly according to claim 1, wherein said door body includes an inner surface and an outer surface, and wherein said sensor is positioned on at least one of said inner surface of said door body and said outer surface of said door body.

15. A door assembly for an instrument panel of a vehicle comprising:
   a door body movably attached to an instrument panel of a vehicle, wherein said instrument panel and said door body define a glove box;
   a sensor adapted to generate a signal that is a function of a desired position of said door body; and
   an actuator selectively coupled to said door body, said actuator operable to enable said door body to move in response to said signal, wherein said sensor is positioned within said door body such that said sensor is not visible from within the passenger compartment of the vehicle and such that said sensor is adapted to detect a condition occurring near said door assembly within the passenger compartment of the vehicle.

16. The door assembly according to claim 1, wherein said actuator comprises at least one of a motor assembly and a damper.

17. The door assembly according to claim 1, further comprising a controller, wherein said controller is a microprocessor capable of receiving said signal from said sensor and generating a signal to said actuator.

18. The door assembly according to claim 1, wherein said sensor is molded within said instrument panel.

19. A door assembly for a vehicle comprising:
an interior component defining a storage compartment having an opening;
a door body movably attached to said interior component to selectively cover said opening;
an actuator selectively coupled to said door body, wherein said actuator is operable to enable said door body to move relative to said interior component;
a field effect sensor which provides an electric field such that when a stimulus interrupts the electric field said sensor senses the interruption and generates a signal; and
a controller for receiving said signal from said sensor and operating said actuator to enable said door body to move relative to the component.

20. The door assembly of claim 19, wherein said actuator is a latch mechanism adapted to selectively release said door body and permit said door body to move and open said storage compartment.

21. The door assembly of claim 19, wherein said actuator includes an electric motor for moving said door body relative to said component.

22. The door assembly of claim 19, wherein said field effect sensor is located remotely from said door body.

23. The door assembly of claim 19, wherein said interior component is an instrument panel, and said instrument panel and said door body define a glove box.

* * * * *